(12) United States Patent
Lee (10) Patent No.: US 10,807,409 B2
(45) Date of Patent: Oct. 20, 2020

(54) COLOR-CHANGEABLE ALLOY WHEEL FOR VEHICLE

(71) Applicants: Hyundai Motor Company, Seoul (KR); Kia Motors Corporation, Seoul (KR)

(72) Inventor: Seon-Yong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 171 days.

(21) Appl. No.: 16/179,926

(22) Filed: Nov. 3, 2018

(65) Prior Publication Data

US 2019/0322129 A1 Oct. 24, 2019

(30) Foreign Application Priority Data

Apr. 23, 2018 (KR) .................... 10-2018-0046931

(51) Int. Cl.
| | |
|---|---|
| B60B 7/00 | (2006.01) |
| G02F 1/15 | (2019.01) |
| G02F 1/155 | (2006.01) |
| G02F 1/163 | (2006.01) |
| H01H 35/10 | (2006.01) |
| G02F 1/153 | (2006.01) |
| G02F 1/1503 | (2019.01) |

(52) U.S. Cl.
CPC ............ *B60B 7/004* (2013.01); *G02F 1/1503* (2019.01); *G02F 1/155* (2013.01); *G02F 1/1508* (2013.01); *G02F 1/1533* (2013.01); *G02F 1/163* (2013.01); *H01H 35/10* (2013.01); *G02F 2001/1536* (2013.01)

(58) Field of Classification Search
CPC ......... B60B 7/00; B60B 7/0033; B60B 7/004; B60B 7/0053; G02F 1/15; G02F 1/1514; G02F 1/15145; G02F 1/1516; C09K 11/00
See application file for complete search history.

(56) References Cited

U.S. PATENT DOCUMENTS

| | | | |
|---|---|---|---|
| 7,611,267 B2 | 11/2009 | Cooper | |
| 2015/0137582 A1* | 5/2015 | Culiver, III | ............... B60B 7/14 301/37.105 |
| 2015/0378234 A1* | 12/2015 | Konkin | ................. G02F 1/1503 359/265 |

FOREIGN PATENT DOCUMENTS

| | | |
|---|---|---|
| JP | H01-083601 U | 6/1989 |
| JP | H07-205605 A | 8/1995 |
| KR | 2009-0087318 A | 8/2009 |
| KR | 2016-0079174 A | 7/2016 |
| KR | 2017-0109797 A | 10/2017 |

\* cited by examiner

*Primary Examiner* — Jason R Bellinger
(74) *Attorney, Agent, or Firm* — Mintz Levin Cohn Ferris Glovsky and Popeo, P.C.; Peter F. Corless (57) ABSTRACT

A color-changeable alloy wheel of a vehicle has an electrochromic paint deposited on the alloy wheel, so that a color of the alloy wheel changes according to a rotational speed thereof. The color-changeable alloy wheel includes: the electrochromic paint deposited on an outer side surface of the alloy wheel, and a current supplied from a battery of the vehicle to the alloy wheel when the rotational speed of the alloy wheel is higher than a predetermined speed, in order to change the color of the alloy wheel.

20 Claims, 10 Drawing Sheets

| CLEAR COAT (NOT PAINTED) |
|---|
| TRANSPARENT ELECTRODE (NOT PAINTED) |
| OXIDATION/REDUCTION DECOLORATION MATERIAL (NOT PAINTED) |
| ELECTROLYTE (NOT PAINTED) |
| ION STORAGE LAYER (NOT PAINTED) |
| ALLOY WHEEL (POSITIVE ELECTRODE) |

COLOR-CHANGEABLE ALLOY WHEEL FOR VEHICLE

CROSS-REFERENCE TO RELATED APPLICATION(S)

This application claims under 35 U.S.C. § 119(a) the benefit of Korean Patent Application No. 10-2018-0046931, filed on Apr. 23, 2018, the entire contents of which are incorporated herein by reference.

BACKGROUND

(a) Technical Field

The present disclosure relates to a color-changeable alloy wheel for a vehicle, more particularly, to the color-changeable alloy wheel having an electrochromic paint deposited on the alloy wheel, such that during driving of the vehicle, a color of the alloy wheel changes according to a rotational speed thereof.

(b) Description of Related Art

Generally, an alloy wheel has paint that is applied to a wheel of the vehicle during manufacturing, but is not changed during subsequent use of the alloy wheel.

Although this does not affect performance of the vehicle, there is a lack of diversity in the appearance or design of wheels.

SUMMARY

The present disclosure provides a color-changeable alloy wheel of a vehicle which is changed in color according to a speed of the vehicle, in particular, based on a rotational speed of the alloy wheel that is achieved while driving the vehicle, where an electrochromic paint is deposited on the alloy wheel and power is applied thereto according to the rotational speed thereof.

In order to achieve the above-mentioned object, a color-changeable alloy wheel according to the present disclosure has an electrochromic paint deposited on an outer side surface of the alloy wheel, and a current is supplied from a battery of the vehicle to the alloy wheel when a rotational speed of the alloy wheel is higher than a predetermined speed, to change a color of the alloy wheel.

The electrochromic paint deposited on the alloy wheel may be formed by sequentially stacking an ion storage layer, an electrolyte, an oxidation/reduction color-changeable material, a transparent electrode, and a clear coat.

The alloy wheel may have a protruding wall portion formed on an inner diameter surface thereof and protruding in a direction perpendicular to the inner diameter surface, and a power switch configured to supply a power to the alloy wheel is fastened to the protruding wall portion.

The power switch may include a housing having a spring hole formed in a central portion of an upper surface thereof; a spring passing through the spring hole in an axial direction; a centrifugal force-acting part connected to an end portion of the spring placed outside the housing; and a switch part configured to be turned on/off by the spring to apply the power to a current supply part.

The current supply part may be formed on one side surface of the housing.

The current supply part may include a first protrusion protruding outward from the one side surface of the housing by a predetermined length; and a second protrusion formed at a central portion of the first protrusion to have a diameter smaller than that of the first protrusion and having a shape protruding outward from an end portion of the first protrusion by a length greater than that of the first protrusion.

The protruding wall portion may have a power switch insertion recess formed therein to have a predetermined length from a first side toward a second side in an axial direction of the alloy wheel.

The power switch insertion recess may include a first recess portion having a shape in which the protruding wall portion is removed to a predetermined depth from a first side toward a second side; and a second recess portion formed at a central portion of the first recess portion to have a diameter less than that of the first recess portion and having a shape in which the protruding wall portion is removed from one end portion of the first recess portion toward the second side of the protruding wall portion to a depth greater than that of the first recess portion.

The electrochromic paint deposited on an inner side surface of the first recess portion may be formed by sequentially stacking an ion storage layer; an electrolyte; an oxidation/reduction color-changeable material; and a transparent electrode.

No electrochromic paint may be deposited on an inner side surface of the second recess portion.

The first protrusion may be inserted into the first recess portion to allow an outer surface of the first protrusion to be brought into contact with an inner surface of the first recess portion.

The second protrusion may be inserted into the second recess portion to allow an outer surface of the second protrusion to be brought into contact with an inner surface of the second recess portion.

The outer surface of the first protrusion may be a cathode (negative electrode).

The outer surface of the second protrusion may be an anode (positive electrode).

The spring may be compressed toward an inside of the housing when a centrifugal force acts on the centrifugal force-acting part.

The spring compressed by the centrifugal force-acting part may apply power to the switch part.

The current supply part may supply a current to the alloy wheel when the power is applied to the switch part.

The housing of the power switch may have bolt recesses formed at both sides of the current supply part on the one side surface thereof, each of the bolt recesses has a thread formed on an inner surface thereof.

The protruding wall portion may have through holes formed at both sides of the power switch insertion recess, respectively, and passing through both side surfaces thereof.

The protruding wall portion may be coupled to the power switch by screw-coupling a bolt, which passes through the through hole of the protruding wall portion from the second side of the protruding wall portion toward the first side, to the bolt recess of the power switch.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In order to fully understand the present disclosure, preferred embodiments of the present disclosure will be described with reference to the accompanying drawings. The embodiments of the present disclosure may be modified in various forms, and the scope of the present disclosure should not be construed as being limited to the embodiments described in detail below. The present embodiments are provided to enable those skilled in the art to more fully understand the present disclosure. Therefore, shapes and the like of elements in the drawings may be exaggerated in order to emphasize clearer explanation. It should be noted that the same elements in the drawings are denoted by the same reference numeral. Detailed descriptions of well-known functions and configurations that may unnecessarily obscure the gist of the present disclosure are omitted.

The present disclosure relates to a color-changeable alloy wheel, and more particularly, to a color-changeable alloy wheel for a vehicle, which is changed in color according to a rotational speed thereof by depositing an electrochromic paint thereon.

Figure 1:
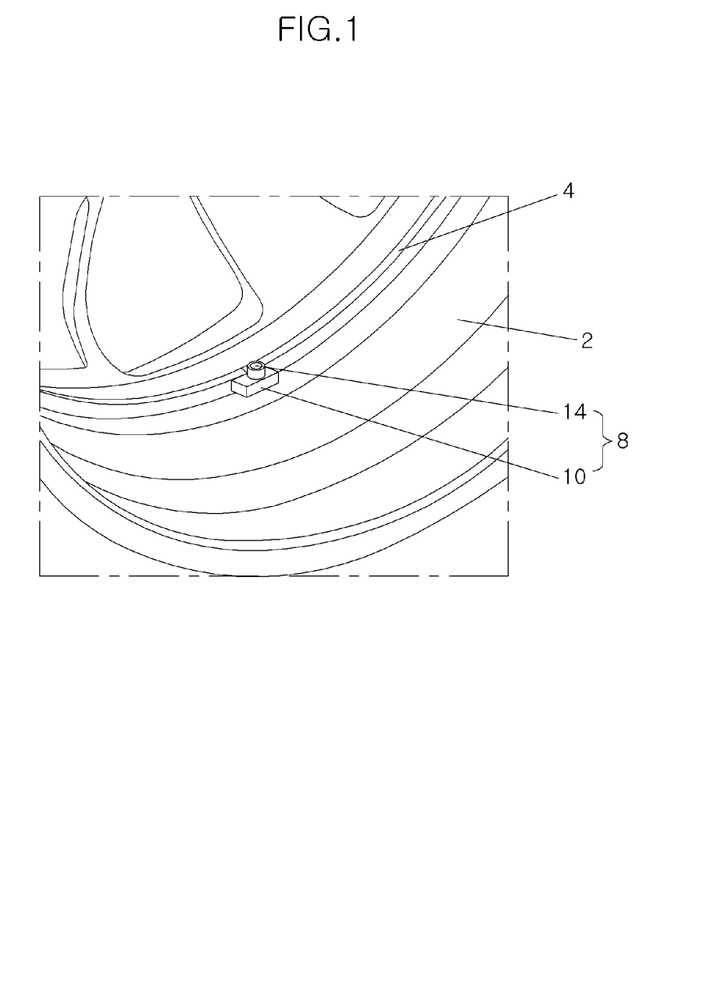
FIG. 1 is a conceptual view of a color-changeable alloy wheel according to the present disclosure.

FIG. 1 illustrates a conceptual view of a color-changeable alloy wheel according to the present disclosure.

A power switch for supplying power to an alloy wheel is fastened to the alloy wheel according to the present disclosure. First, a shape of the alloy wheel for allowing the power switch to be fastened thereto will be described.

Figure 2:
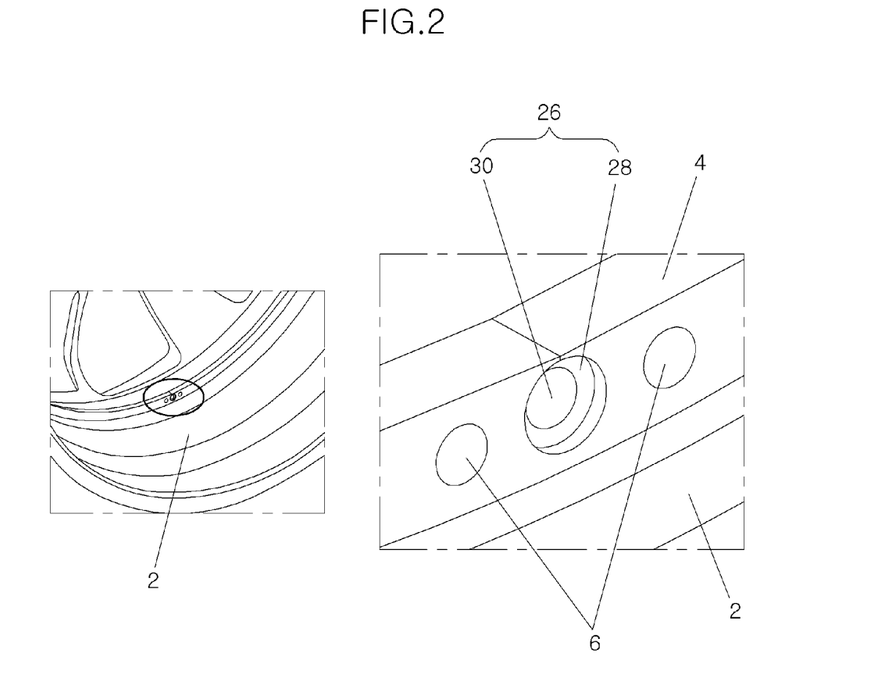
FIG. 2 is a view illustrating a power switch mounting part of the color-changeable alloy wheel according to the present disclosure.

FIG. 2 illustrates a power switch mounting part of the color-changeable alloy wheel according to the present disclosure.

On an inner diameter surface of an alloy wheel 2, a protruding wall portion 4 protrudes toward a central portion of the alloy wheel 2 in a direction perpendicular to the inner diameter surface.

A power switch insertion recess 26 is formed in the protruding wall portion 4 and has a shape in which the protruding wall portion is removed from a first side of the alloy wheel 2 toward a second side by a predetermined length in an axial direction of the alloy wheel.

The power switch insertion recess 26 is formed in a stepwise shape and includes a first recess portion 28 having a shape in which the protruding wall portion is removed to a predetermined depth from the first side thereof toward the second side in an axial direction of the protruding wall portion 4 and a second recess portion 30 formed at a central portion of the first recess portion 28 to have a diameter less than that of the first recess portion 28 and having a shape in which protruding wall portion is removed from one end portion of the first recess portion 28 toward the second side of the protruding wall portion 4 to a predetermined depth.

In other words, the first recess portion 28 and the second recess portion 30 are stepwisely formed, and the second recess portion 30 is formed to have a length in the axial direction greater than that of the first recess portion 28.

In the protruding wall portion 4, through holes 6 penetrating both side surfaces of the protruding wall portion 4 are formed at positions spaced apart from the power switch insertion recess 26 to both sides the power switch insertion recess 26 at a certain interval, respectively.

A central axis of the through hole 6 is parallel to a central axis of the power switch insertion recess 26, and the central axis of the power switch insertion recess 26 is parallel to a central axis of the alloy wheel 2.

Figure 3:
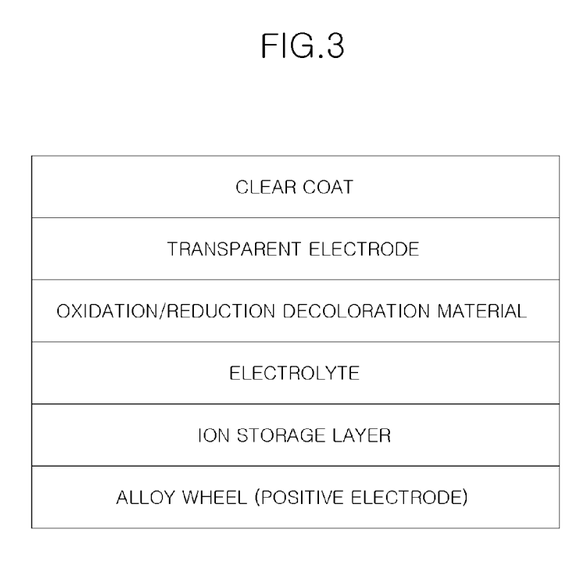
FIG. 3 is a view illustrating a stacking sequence of elements constituting an electrochromic paint deposited on the color-changeable alloy wheel according to the present disclosure.

FIG. 3 illustrates a stacking sequence of elements constituting an electrochromic paint deposited on the color-changeable alloy wheel according to the present disclosure.

The electrochromic paint is deposited on an outer surface of the alloy wheel 2 except for the first and second recesses 28 and 30. The electrochromic paint is deposited by sequentially stacking an ion storage layer, an electrolyte, an oxidation/reduction color-changeable material, a transparent electrode, and a clear coat.

Since the transparent electrode and the clear coat are transparent, a color of the oxidation/reduction color-changeable material appears on the alloy wheel 2 as it is. Therefore, when the color of the oxidation/reduction color-changeable material is changed, the changed color of the color-changeable material appears on the alloy wheel 2 as it is, and thus the color of the alloy wheel 2 is seen as being changed.

Figure 4:
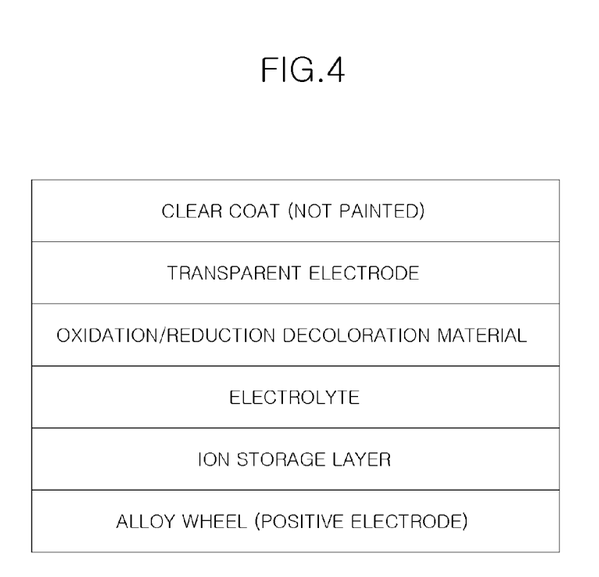
FIG. 4 is a view illustrating a stacking sequence of elements constituting the electrochromic paint deposited on a first recess portion of the color-changeable alloy wheel according to the present disclosure.

FIG. 4 illustrates a stacking sequence of elements constituting the electrochromic paint deposited on the first recess portion of the color-changeable alloy wheel according to the present disclosure.

The clear coat, which is one of the above elements constituting the electrochromic paint, is not stacked on an inner side surface of the first recess portion 28. That is, the ion storage layer, the electrolyte, the oxidation/reduction color-changeable material and the transparent electrode are sequentially stacked on the inner side surface of the first recess portion 28.

Figure 5:
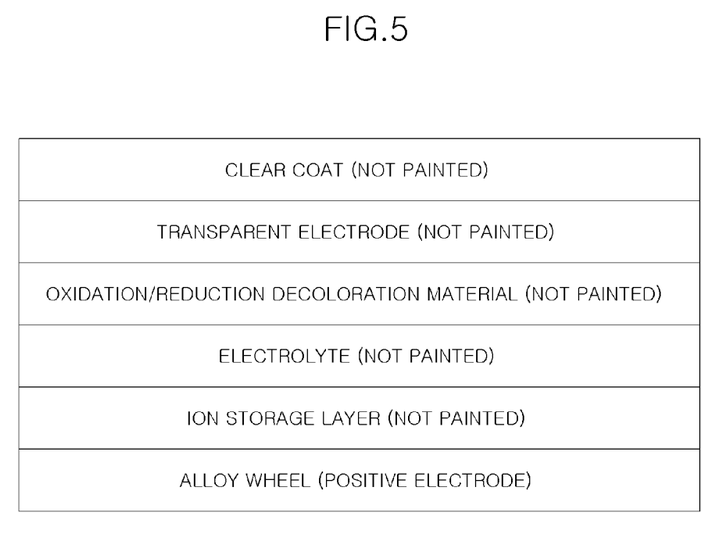
FIG. 5 is a view illustrating a stacking sequence of elements constituting the electrochromic paint deposited on a second recess portion of the color-changeable alloy wheel according to the present disclosure.

FIG. 5 illustrates a stacking sequence of elements constituting the electrochromic paint deposited on the second recess portion of the color-changeable alloy wheel according to the present disclosure.

No electrochromic paint is deposited on an inner side surface of the second recess portion 30. In other words, the inner side surface of the second recess portion 30 becomes a state in which an alloy material constituting the alloy wheel is exposed.

Figure 6:
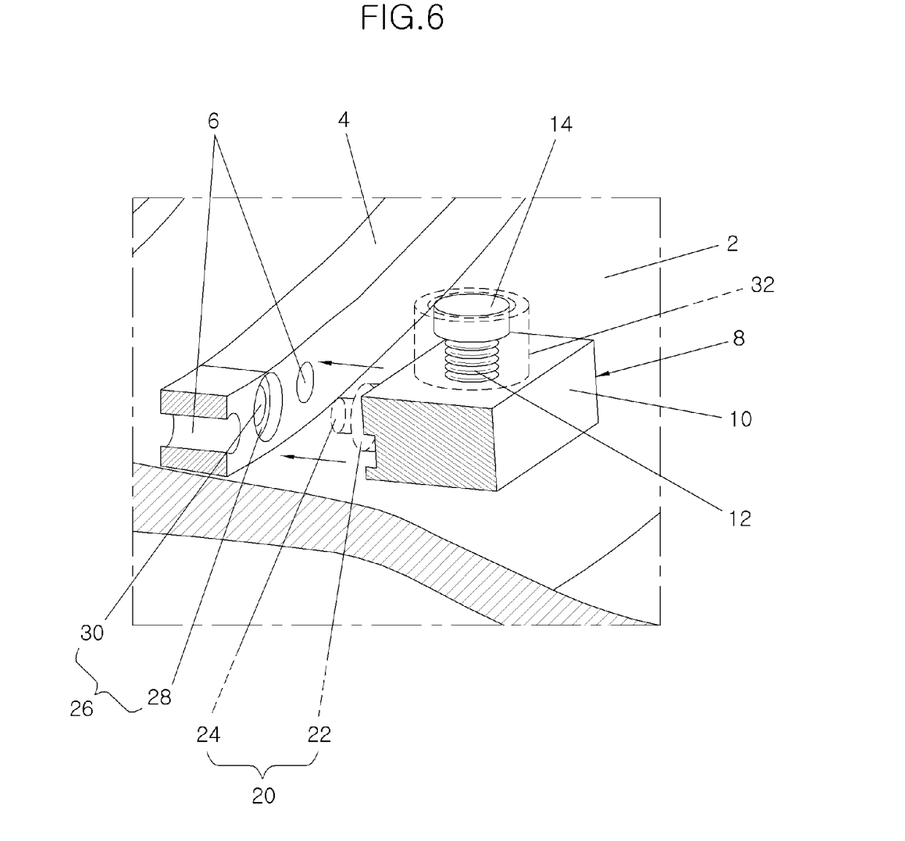
FIG. 6 is a rear conceptual view illustrating a state in which a power switch according to the present disclosure is being mounted.
Figure 7:
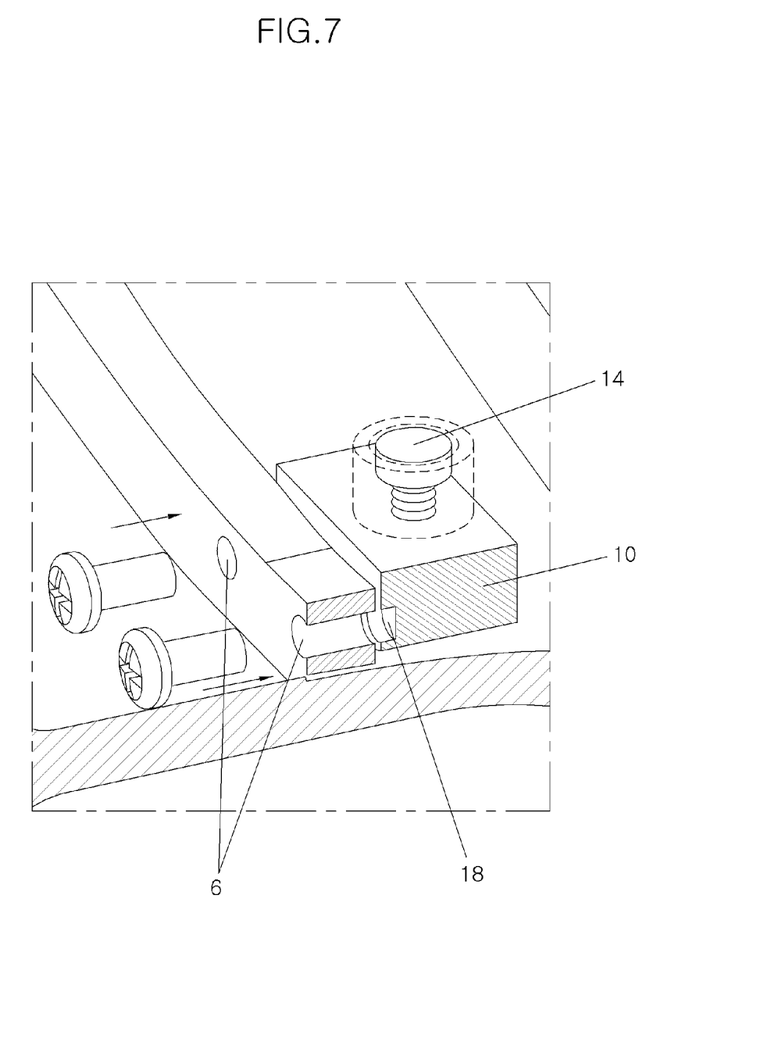
FIG. 7 is a front conceptual view illustrating a state in which the power switch according to the present disclosure is being mounted.

FIG. 6 illustrates a rear conceptual view showing a state in which a power switch according to the present disclosure is being mounted, and FIG. 7 illustrates a front conceptual view showing a state in which a power switch according to the present disclosure is being mounted.

A power switch 8 configured to supply power to the alloy wheel 2 is fastened to the power switch insertion recess 26 of the protruding wall portion 4.

The power switch 8 includes a housing 10 having a spring hole formed in a central portion of an upper surface thereof and a receiving space formed in an inner side thereof, a spring 12 passing through the spring hole in an axial direction, a centrifugal force-acting part 14 connected and mounted to an end portion of the spring 12 placed outside the housing 10, and a switch part 16 configured to be turned on/off by the spring 12 to apply a current to a current supply part 20.

When an external force acts on the centrifugal force-acting part 14, the spring 12 is inserted to an inside of the housing 10 while the centrifugal force-acting part 14 compresses the spring 12.

In the housing 10, a protective wall 32 surrounding the spring 12 and an outer circumferential surface of the centrifugal force-acting part 14 is formed at a portion spaced apart from the spring 12 and the outer circumferential surface of the centrifugal force acting portion 14 by a predetermined distance. The protection wall 32 prevents the spring 12 from swinging in a lateral direction.

The current supply part 20 is formed on one side surface of the housing 10.

The current supply part 20 includes a first protrusion 22 having a shape protruding outward from the one side surface of the housing 10 by a predetermined length to be perpendicular to the one side surface of the housing 10, and a second protrusion 24 formed at a central portion of the first protrusion 22 to have a diameter smaller than that of the first protrusion 22 and having a shape protruding outward from an end portion of the first protrusion 22 by a length greater than that of the first protrusion 22 so as to be perpendicular to a front end surface of the first protrusion 22.

In the one side surface of the housing 10 of the power switch 8, bolt recesses 18, each of which has a thread formed on an inner surface thereof, are formed at portions spaced apart from the current supply part 20 to both sides of the current supply part 20 at a predetermined interval, respectively.

Figure 8:
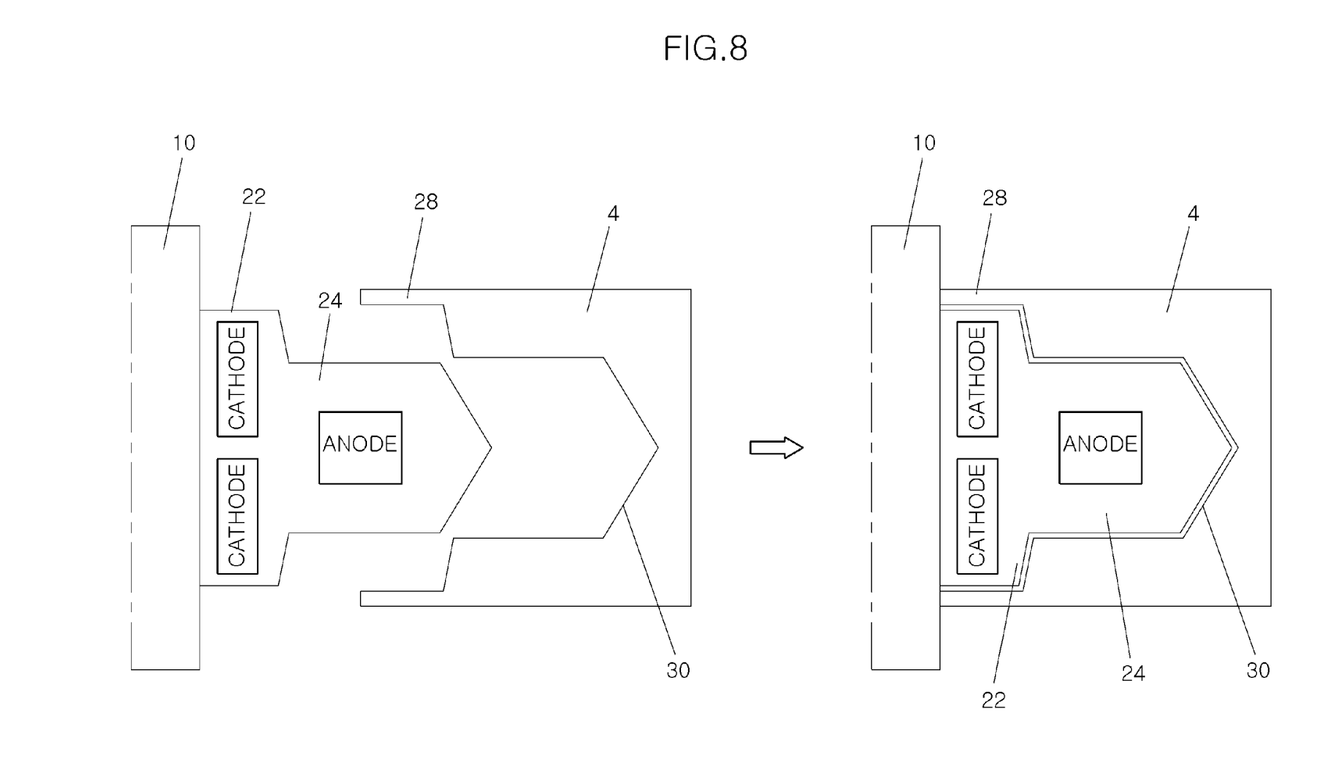
FIG. 8 is a cross-sectional view illustrating a state in which the power switch is being mounted to the color-changeable alloy wheel according to the present disclosure.

FIG. 8 illustrates a cross-sectional view showing a state in which the power switch is being mounted to the color-changeable alloy wheel according to the present disclosure.

When the power switch 8 is fastened to the protruding wall portion 4 of the alloy wheel 2, the first protrusion 22 is inserted into the first recess portion 28 such that an outer surface of the first protrusion is brought into contact with an inner surface of the first recess portion 28, and the second protrusion 24 is inserted into the second recess portion 30 such that an outer surface of the second protrusion is brought into contact with an inner surface of the second recess portion 30.

When the current supply part 20 is inserted into the power switch insertion recess 26, a bolt passing through the through hole 6 of the protruding wall portion 4 from the second side of the protruding wall portion 4 toward the first side is screw-coupled to the bolt recess 18 of the power switch 8 to couple the power switch 8 and the alloy wheel 2 to each other.

The outer surface of the first protrusion 22 has a cathode (negative electrode) characteristic and the outer surface of the second protrusion 24 has an anode (positive electrode) characteristic. Therefore, when the current supply part 20 is inserted into the power switch insertion recess 26, a cathode (negative electrode) is brought into contact with the first recess portion 28 into which the first projection 22 is inserted and an anode (positive electrode) is brought into contact with the second recess portion 30 into which the second protrusion 24 is inserted, to supply a current to the alloy wheel 2.

Figure 9:
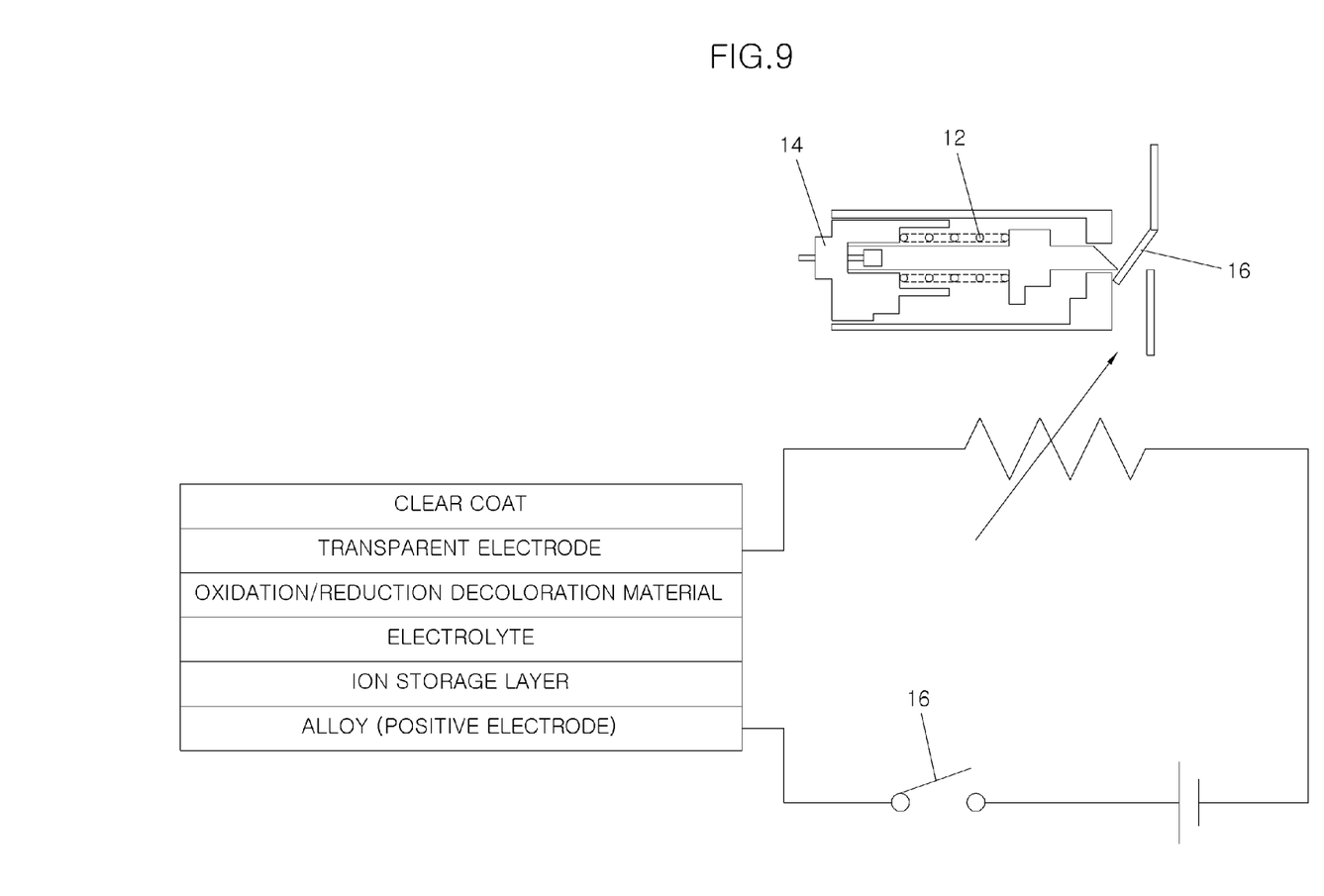
FIG. 9 is a conceptual view illustrating a power connection when a spring of the power switch according to the present disclosure is not compressed.
Figure 10:
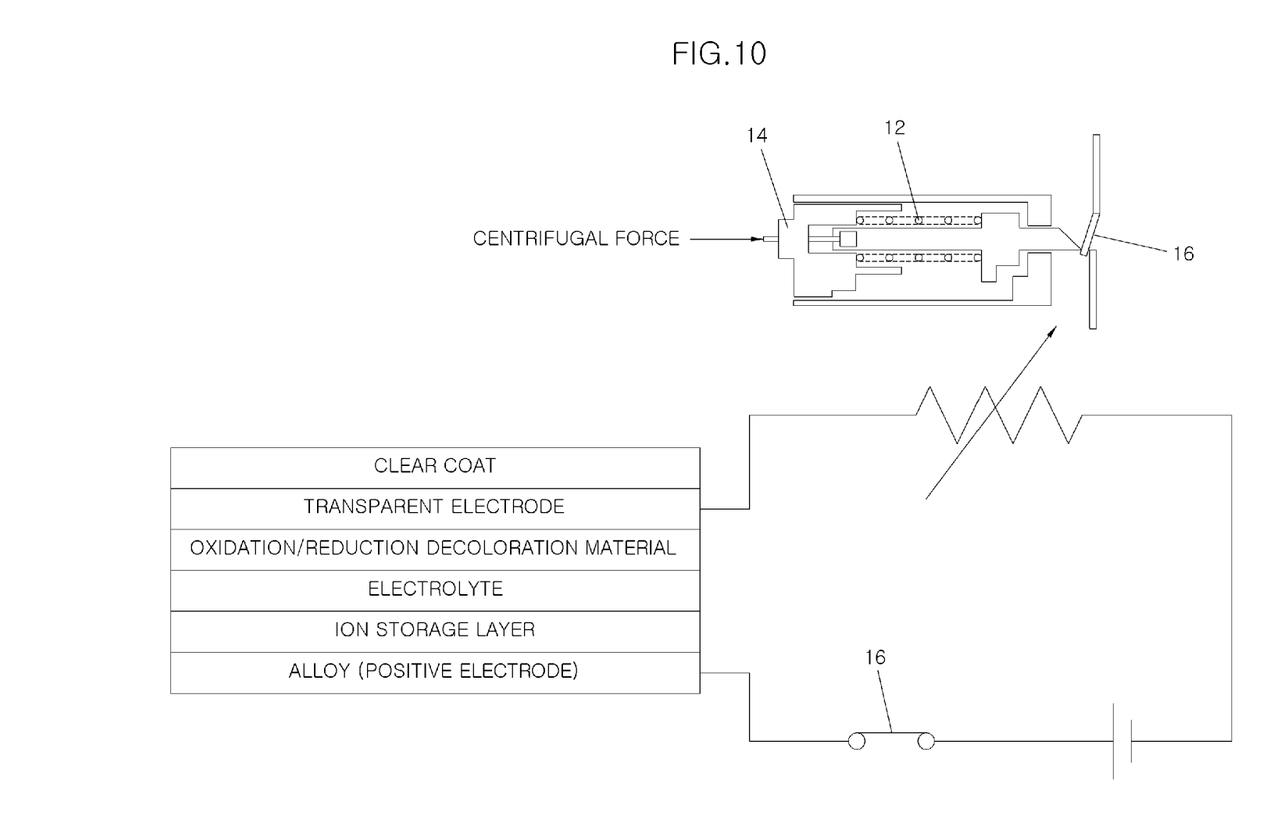
FIG. 10 is a conceptual view illustrating a power connection when the spring of the power switch according to the present disclosure is compressed.

FIG. 9 illustrates a conceptual view showing a power connection when the spring of the power switch according to the present disclosure is not compressed, and FIG. 10 illustrates a conceptual view showing a power connection when the spring of the power switch according to the present disclosure is compressed.

When a rotational speed of the alloy wheel 2 is equal to or lower than a predetermined speed according to a speed of a vehicle, the spring 12 is in a tensioned state as illustrated in FIG. 9, and the spring 12 does not apply a force to the switch part 16, and thus the switch part 16 is maintained in a state where the power is not applied to the switch part.

When a rotational speed of the alloy wheel 2 is higher than a predetermined speed according to a speed of the vehicle, as illustrated in FIG. 10, a centrifugal force acts on the centrifugal force-acting part 14, so that the centrifugal force-acting part 14 compresses the spring 12. The spring 12 is compressed toward the inside of the housing 10 by the centrifugal force-acting part 14, and the spring 12 is compressed to apply a force to the switch part 16, and thus the power is applied to the switch part 16.

When the power is applied to the switch part 16, the current supply part 20 supplies the current to the alloy wheel 2 from a battery of the vehicle to change the color of the alloy wheel 2.

If the alloy wheel 2 of the present disclosure as described above is configured to allow the color thereof to be changed when the vehicle is driven at a speed higher than a specific speed, it is possible to easily visually confirm a violation of the speed limit. Therefore, as a result, it may be possible to encourage and/or prevent speeding.

In addition, according to the present disclosure, there is an effect that the color of the alloy wheel can be expressed in two dimensions in accordance with the rotational speeds of the alloy wheel, such as when the vehicle is running and stopping.

The above-described embodiment of the color-changeable alloy wheel of the present disclosure is merely illustrative and those skilled in the art to which the present disclosure pertains will appreciate that various modifications and another equivalent embodiment may be made from the above-described embodiment of the present disclosure. It is therefore to be easily understood that the present disclosure is not limited to only the form set forth in the foregoing description. Accordingly, the true technical protection scope of the present disclosure should be determined by the technical idea of the appended claims. It is also to be understood that the present disclosure includes all modifications, equivalents, and substitutes falling within the spirit and scope of the present disclosure defined by the appended claims.

What is claimed is:

1. A color-changeable alloy wheel of a vehicle, comprising:
    an electrochromic paint deposited on an outer side surface of the alloy wheel, and
    a current supplied from a battery of the vehicle to the alloy wheel when a rotational speed of the alloy wheel is higher than a predetermined speed, to change a color of the alloy wheel.

2. The color-changeable alloy wheel of claim 1, wherein the electrochromic paint deposited on the alloy wheel is formed by sequentially stacking an ion storage layer, an electrolyte, an oxidation/reduction color-changeable material, a transparent electrode, and a clear coat.

3. The color-changeable alloy wheel of claim 1, wherein the alloy wheel has a protruding wall portion formed on an inner diameter surface thereof and protruding in a direction perpendicular to the inner diameter surface, and a power switch configured to supply power to the alloy wheel is fastened to the protruding wall portion.

4. The color-changeable alloy wheel of claim 3, wherein the power switch comprises:
    a housing having a spring hole formed in a central portion of an upper surface thereof;
    a spring passing through the spring hole in an axial direction;
    a centrifugal force-acting part connected to an end portion of the spring placed outside the housing; and
    a switch part configured to be turned on/off by the spring to apply the power to a current supply part.

5. The color-changeable alloy wheel of claim 4, wherein the current supply part is formed on one side surface of the housing.

6. The color-changeable alloy wheel of claim 5, wherein the current supply part comprises:
    a first protrusion protruding outward from the one side surface of the housing by a predetermined length; and
    a second protrusion formed at a central portion of the first protrusion to have a diameter smaller than that of the first protrusion and having a shape protruding outward from an end portion of the first protrusion by a length greater than that of the first protrusion.

7. The color-changeable alloy wheel of claim 6, wherein the protruding wall portion has a power switch insertion recess formed therein to have a predetermined length from a first side toward a second side in an axial direction of the alloy wheel.

8. The color-changeable alloy wheel of claim 7, wherein the power switch insertion recess comprises:
    a first recess portion having a shape in which the protruding wall portion is removed to a predetermined depth from the first side toward the second side; and
    a second recess portion formed at a central portion of the first recess portion to have a diameter less than that of the first recess portion and having a shape in which the protruding wall portion is removed from one end portion of the first recess portion toward the second side of the protruding wall portion to a depth greater than that of the first recess portion.

9. The color-changeable alloy wheel of claim 8, wherein the electrochromic paint deposited on an inner side surface of the first recess portion is formed by sequentially stacking an ion storage layer, an electrolyte, an oxidation/reduction color-changeable material, and a transparent electrode.

10. The color-changeable alloy wheel of claim 8, wherein no electrochromic paint is deposited on an inner side surface of the second recess portion.

11. The color-changeable alloy wheel of claim 8, wherein the first protrusion is inserted into the first recess portion to allow an outer surface of the first protrusion to be brought into contact with an inner surface of the first recess portion.

12. The color-changeable alloy wheel of claim 8, wherein the second protrusion is inserted into the second recess portion to allow an outer surface of the second protrusion to be brought into contact with an inner surface of the second recess portion.

13. The color-changeable alloy wheel of claim 6, wherein the outer surface of the first protrusion is a cathode (negative electrode).

14. The color-changeable alloy wheel of claim 6, wherein the outer surface of the second protrusion is an anode (positive electrode).

15. The color-changeable alloy wheel of claim 4, wherein the spring is compressed toward an inside of the housing when a centrifugal force acts on the centrifugal force-acting part.

16. The color-changeable alloy wheel of claim 15, wherein the spring compressed by the centrifugal force-acting part applies power to the switch part.

17. The color-changeable alloy wheel of claim 16, wherein the current supply part supplies a current to the alloy wheel when the power is applied to the switch part.

18. The color-changeable alloy wheel of claim 5, wherein the housing of the power switch has bolt recesses formed at both sides of the current supply part on the one side surface thereof, each of the bolt recesses has a thread formed on an inner surface thereof.

19. The color-changeable alloy wheel of claim 8, wherein the protruding wall portion has through holes formed at both sides of the power switch insertion recess, respectively, and passing through both side surfaces thereof.

20. The color-changeable alloy wheel of claim 19, wherein the protruding wall portion is coupled to the power switch by screw-coupling a bolt, which passes through the through hole of the protruding wall portion from the second side of the protruding wall portion toward the first side, to the bolt recess of the power switch.

* * * * *